United States Patent
Booher et al.

(10) Patent No.: US 9,469,352 B2
(45) Date of Patent: Oct. 18, 2016

(54) HALF-ROUND TRAILER AND TRAILER BODY WITH EXTRUDED PANEL SIDE WALLS

(71) Applicant: East Manufacturing Corporation, Randolph, OH (US)

(72) Inventors: Howard D. Booher, Atwater, OH (US); Russell D. Pittman, Atwater, OH (US)

(73) Assignee: East Manufacturing Corporation, Randolph, OH (US)

( * ) Notice: Subject to any disclaimer, the term of this patent is extended or adjusted under 35 U.S.C. 154(b) by 0 days.

(21) Appl. No.: 14/733,316

(22) Filed: Jun. 8, 2015

(65) Prior Publication Data

US 2015/0274219 A1    Oct. 1, 2015

Related U.S. Application Data

(60) Division of application No. 14/047,510, filed on Oct. 7, 2013, now Pat. No. 9,051,012, which is a continuation of application No. 13/049,382, filed on Mar. 16, 2011, now Pat. No. 8,550,542.

(60) Provisional application No. 61/314,956, filed on Mar. 17, 2010.

(51) Int. Cl.
| | |
|---|---|
| *B62D 33/00* | (2006.01) |
| *B62D 33/02* | (2006.01) |
| *B62D 33/023* | (2006.01) |
| *B62D 35/00* | (2006.01) |

(52) U.S. Cl.
CPC ............... *B62D 33/02* (2013.01); *B62D 33/00* (2013.01); *B62D 33/023* (2013.01); *B62D 35/001* (2013.01)

(58) Field of Classification Search
CPC ......... A63H 3/52; A01B 23/046; B41J 5/10; F02M 35/10124; F02M 35/10131; B62D 25/2054; B62D 33/023; B62D 29/008; B62D 33/04; B62D 33/044
USPC .................... 296/183.1, 183.2, 184.1, 186.1; 280/789
See application file for complete search history.

(56) References Cited

U.S. PATENT DOCUMENTS

| | | | | |
|---|---|---|---|---|
| 1,805,489 A | * | 5/1931 | Kerr .......................... | B60P 1/26 296/183.1 |
| 2,356,008 A | | 8/1944 | Schafer | |
| 3,062,338 A | * | 11/1962 | De Ridder ................ | E04C 2/08 52/579 |
| 3,093,254 A | * | 6/1963 | Sammarco ............. | A01D 90/12 220/4.12 |
| 3,692,363 A | * | 9/1972 | Tenebaum ................ | B60P 1/56 105/243 |
| 3,814,479 A | * | 6/1974 | Vornberger ............. | B60P 1/286 296/183.2 |
| 3,886,705 A | * | 6/1975 | Cornland .............. | E04B 1/6179 52/536 |
| 4,230,360 A | * | 10/1980 | Eisenman .............. | B62D 53/06 105/407 |

(Continued)

FOREIGN PATENT DOCUMENTS

WO    WO 2011/071930 A2    6/2011

OTHER PUBLICATIONS

Photograph of East Tub Dump Trailer, date unknown.

(Continued)

(74) *Attorney, Agent, or Firm* — Fay Sharpe LLP

*Primary Examiner* — Kiran B Patel

(57) ABSTRACT

A trailer includes a chassis and a trailer body connected to the chassis. The trailer body includes left and right vertical side walls and a curved floor. The left and right side walls each include a plurality of extruded panels each including an inner wall and an outer wall spaced from the inner wall.

12 Claims, 11 Drawing Sheets

(56) References Cited

U.S. PATENT DOCUMENTS

| | | | | |
|---|---|---|---|---|
| 4,245,945 A * | 1/1981 | Rizzo | ............... | B08B 9/055 |
| | | | | 414/349 |
| 4,550,947 A * | 11/1985 | Booher | ............... | B60P 1/00 |
| | | | | 296/186.1 |
| 4,564,233 A * | 1/1986 | Booher | ............... | B62D 53/061 |
| | | | | 105/347 |
| 4,619,484 A * | 10/1986 | Maxey | ............... | B60P 1/165 |
| | | | | 105/264 |
| 5,041,318 A | 8/1991 | Hulls | | |
| 5,042,395 A | 8/1991 | Wackerle et al. | | |
| 5,090,773 A * | 2/1992 | Guillaume | ............... | B60P 3/22 |
| | | | | 296/183.2 |
| 5,184,872 A * | 2/1993 | Larochelle | ............... | B60P 1/18 |
| | | | | 289/22 AE |
| 5,322,350 A * | 6/1994 | Hinson | ............... | B60P 3/42 |
| | | | | 296/184.1 |
| 5,454,620 A * | 10/1995 | Hill | ............... | B60P 1/04 |
| | | | | 296/183.1 |
| 5,482,356 A * | 1/1996 | Goodson, Jr. | ............... | B60P 1/16 |
| | | | | 298/17 R |
| 5,509,724 A * | 4/1996 | Perry | ............... | B60P 1/16 |
| | | | | 298/22 AE |
| 5,664,826 A * | 9/1997 | Wilkens | ............... | B60P 1/00 |
| | | | | 296/186.1 |
| 5,681,095 A * | 10/1997 | Martin | ............... | B62D 33/02 |
| | | | | 220/691 |
| 5,738,479 A * | 4/1998 | Glen | ............... | B60P 3/42 |
| | | | | 177/136 |
| 6,095,715 A | 8/2000 | Hulls | | |
| 6,142,554 A * | 11/2000 | Carroll | ............... | B60J 7/062 |
| | | | | 296/100.11 |
| 6,382,731 B1 * | 5/2002 | Slutz | ............... | B60P 1/26 |
| | | | | 296/183.2 |
| 6,425,626 B1 * | 7/2002 | Kloepfer | ............... | B62D 33/046 |
| | | | | 229/149 |
| 6,505,891 B1 * | 1/2003 | Hickey | ............... | B60P 1/16 |
| | | | | 298/20 A |
| 6,513,297 B2 | 2/2003 | Kloepfer | | |
| 6,554,367 B2 * | 4/2003 | Jensen | ............... | B60P 1/286 |
| | | | | 298/17.7 |
| 6,612,643 B1 | 9/2003 | McWilliams | | |
| 6,626,498 B1 * | 9/2003 | Ostermeyer | ............ | B60P 1/165 |
| | | | | 298/1 A |
| 6,669,271 B2 * | 12/2003 | Booher | ............... | B21C 23/145 |
| | | | | 296/186.1 |
| 6,688,673 B2 * | 2/2004 | Kloepfer | ............... | B62D 33/046 |
| | | | | 296/181.1 |
| 6,719,360 B1 * | 4/2004 | Backs | ............... | B62D 33/023 |
| | | | | 296/186.1 |
| 6,854,789 B2 | 2/2005 | Kloepfer | | |
| 6,854,808 B2 * | 2/2005 | Kostecki | ............... | B60P 1/286 |
| | | | | 296/183.2 |
| 6,871,904 B2 * | 3/2005 | Bhat | ............... | B62D 25/2054 |
| | | | | 296/183.1 |
| 7,100,972 B2 | 9/2006 | Booher | | |
| 7,152,909 B2 * | 12/2006 | Booher | ............... | B21C 23/145 |
| | | | | 296/182.1 |
| 7,178,860 B2 * | 2/2007 | Lemmons | ............ | B62D 33/046 |
| | | | | 296/186.1 |
| 7,267,393 B2 | 9/2007 | Booher | | |
| 7,338,111 B2 * | 3/2008 | Lemmons | ............ | B62D 33/023 |
| | | | | 105/409 |
| 7,378,000 B2 | 5/2008 | Lemmons | | |
| 7,401,844 B2 | 7/2008 | Lemmons | | |
| 7,481,483 B2 * | 1/2009 | D'Amico | ............... | B60P 1/286 |
| | | | | 296/183.1 |
| 7,770,928 B2 * | 8/2010 | Booher | ............... | B62D 21/20 |
| | | | | 280/785 |
| 7,926,866 B2 * | 4/2011 | Schmidt | ............... | B62D 33/046 |
| | | | | 296/181.1 |
| 7,950,722 B2 | 5/2011 | Booher | | |
| 7,971,926 B2 | 7/2011 | Lemmons | | |
| 7,992,943 B2 * | 8/2011 | Westner | ............... | B90P 1/286 |
| | | | | 298/22 P |
| 8,220,874 B2 * | 7/2012 | Heider | ............... | B90P 1/165 |
| | | | | 298/17.6 |
| D668,583 S | 10/2012 | Booher | | |
| D668,584 S | 10/2012 | Booher | | |
| D668,585 S | 10/2012 | Booher | | |
| 8,303,044 B2 | 11/2012 | Obermeyer | | |
| D674,320 S | 1/2013 | Booher | | |
| 8,745,871 B2 | 6/2014 | Booher | | |
| 8,777,324 B2 | 7/2014 | Wink | | |
| 2002/0041112 A1 | 4/2002 | Foster et al. | | |
| 2002/0084676 A1 | 7/2002 | Kloepfer | | |
| 2003/0011211 A1 | 1/2003 | Booher | | |
| 2005/0248183 A1 | 11/2005 | Booher | | |
| 2006/0170249 A1 | 8/2006 | Conny et al. | | |
| 2006/0237992 A1 | 10/2006 | Lemmons | | |
| 2007/0102961 A1 | 5/2007 | Lemmons | | |
| 2008/0143142 A1 | 6/2008 | Lemmons | | |
| 2009/0322058 A1 | 12/2009 | Shannon | | |
| 2014/0284964 A1 | 9/2014 | Booher | | |

OTHER PUBLICATIONS

Photograph of Fruehauf Dump Trailer, date unknown.

* cited by examiner

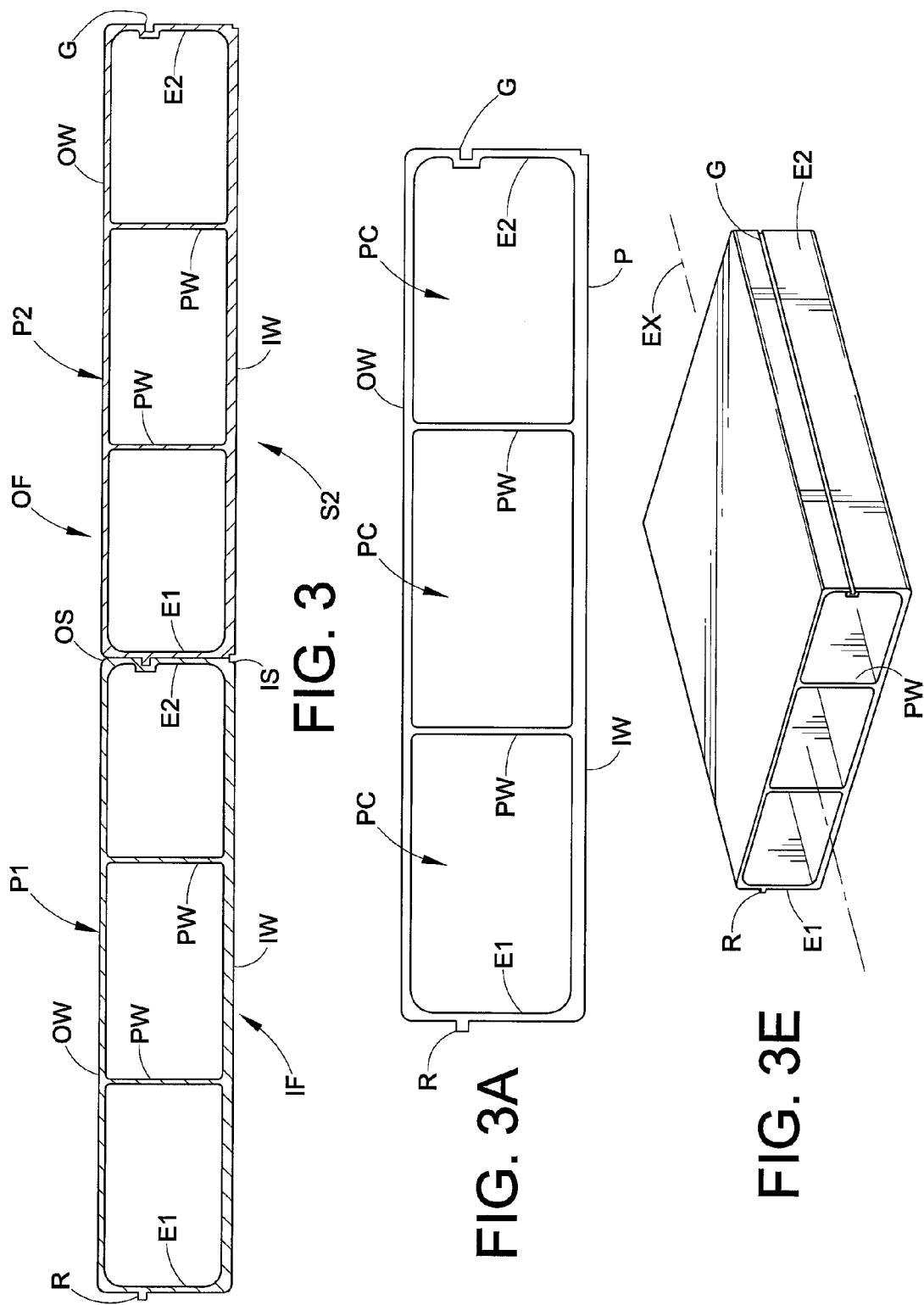

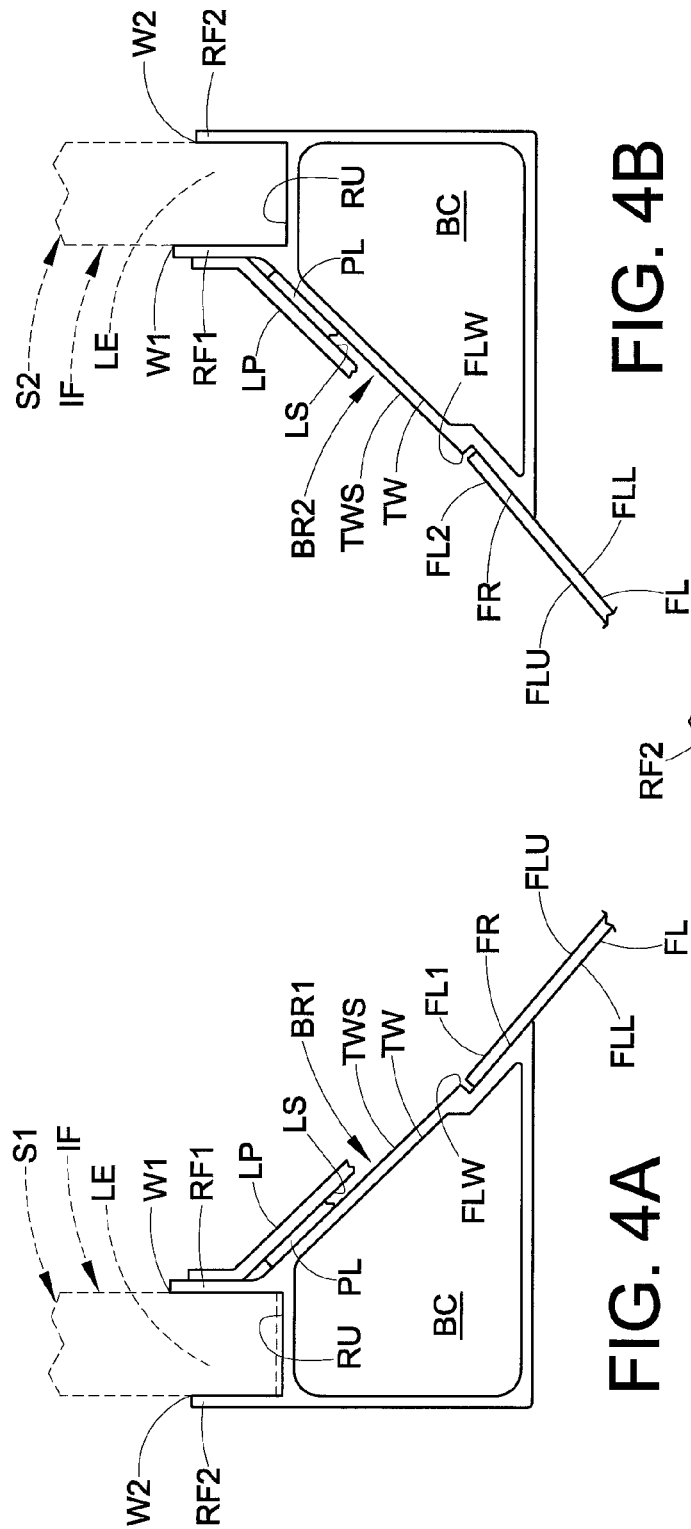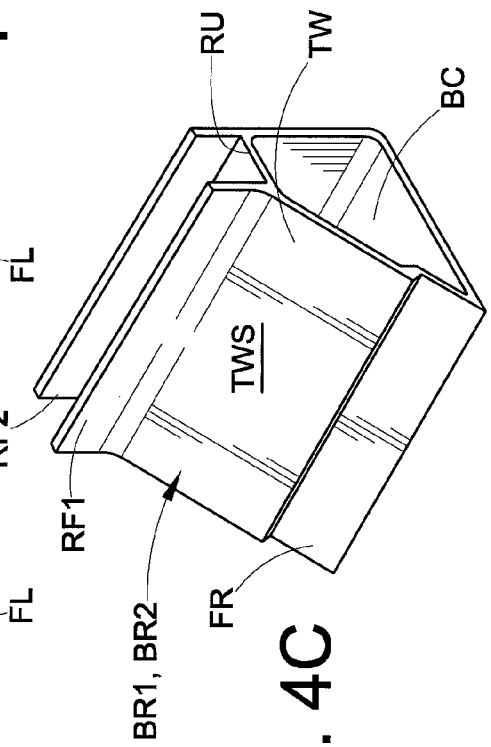

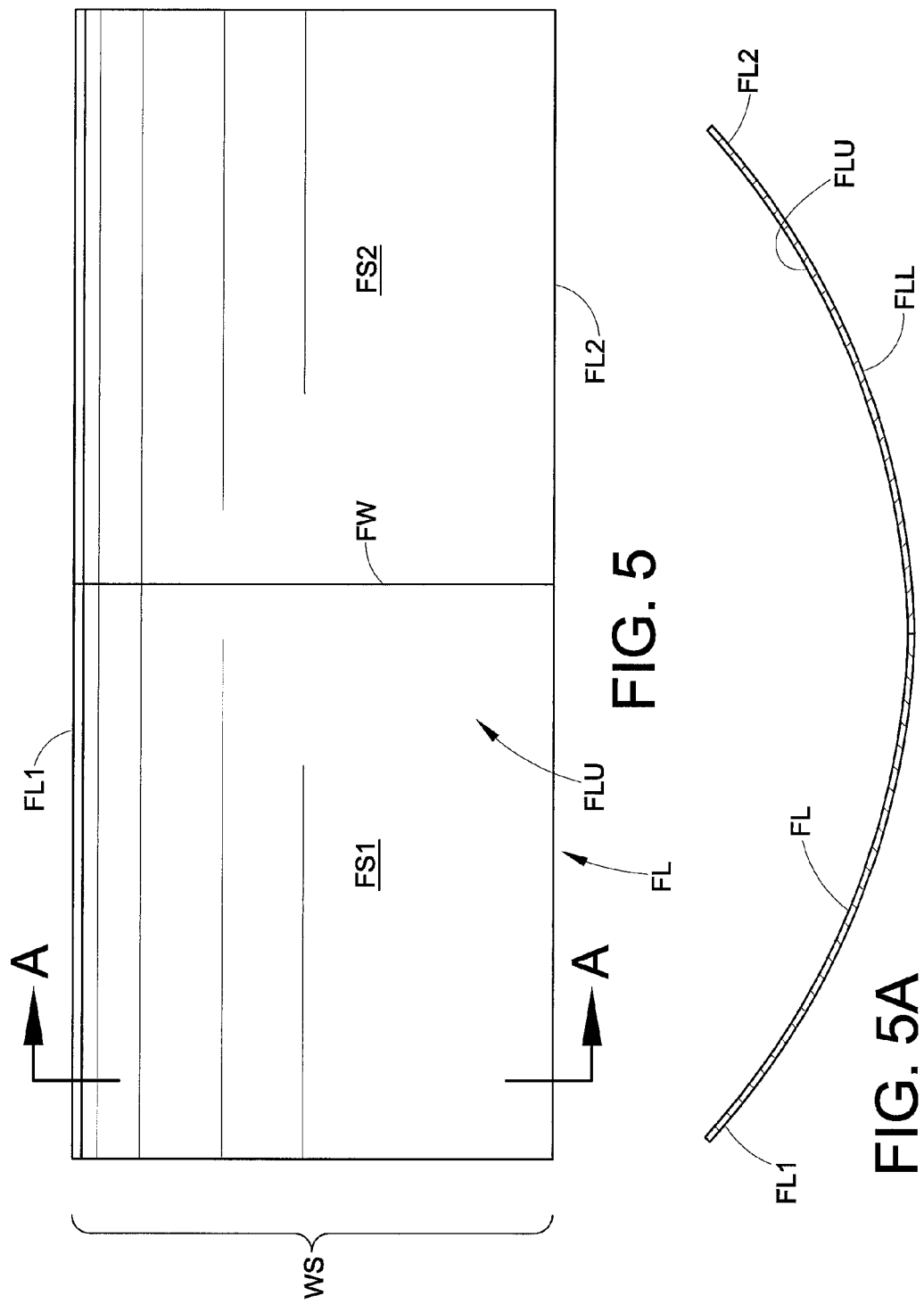

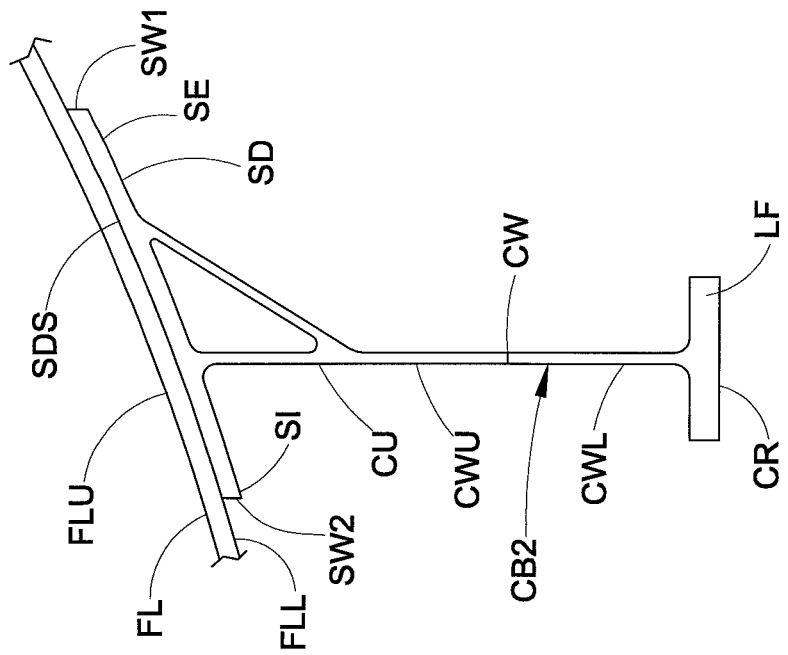
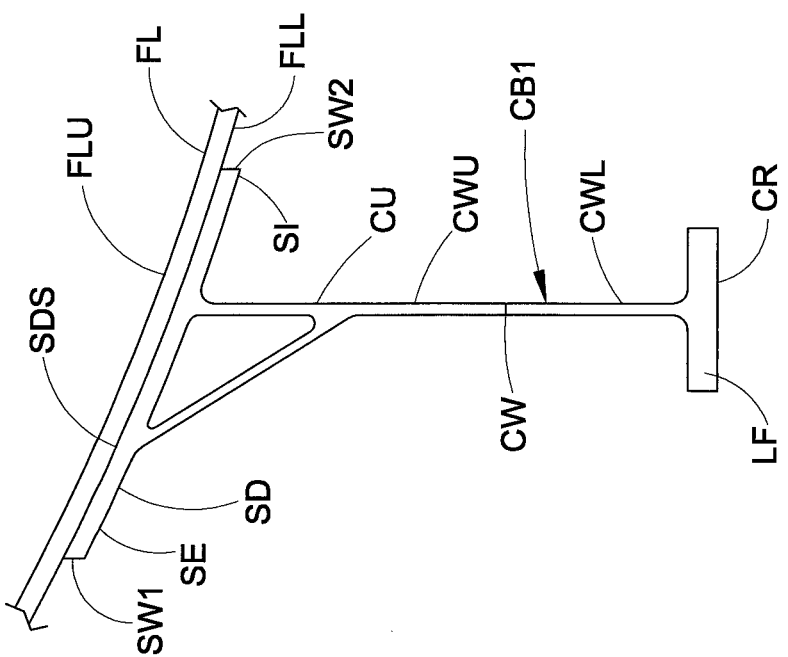
FIG. 6A
FIG. 6B

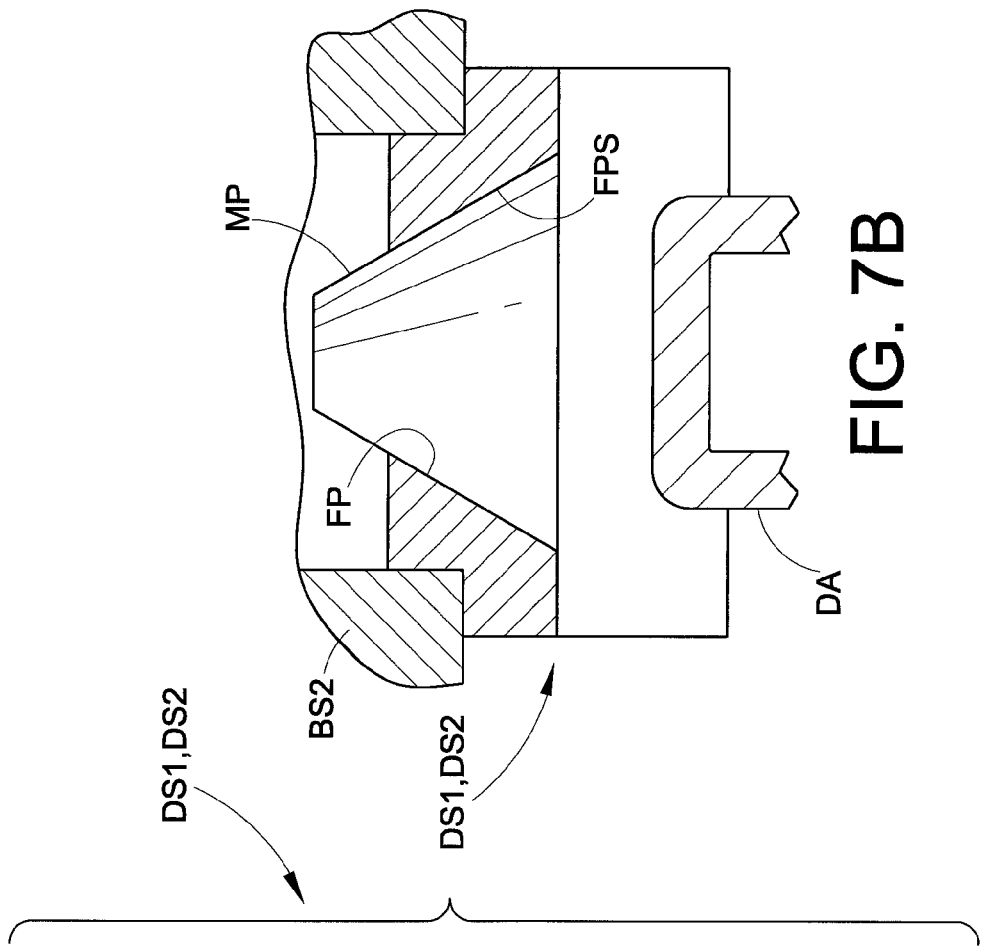
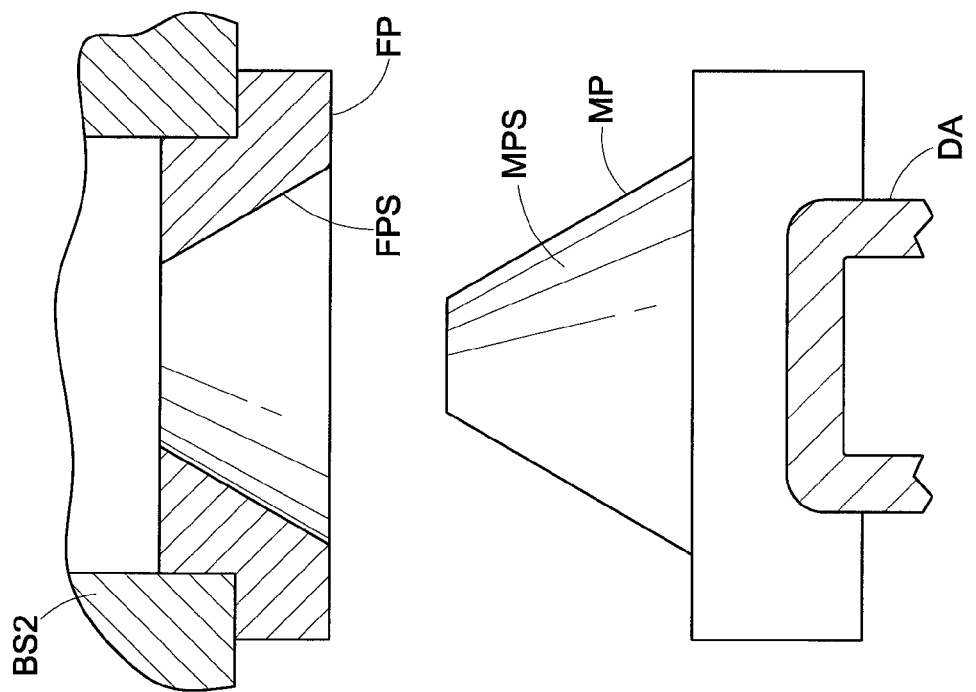
FIG. 7A
FIG. 7B

HALF-ROUND TRAILER AND TRAILER BODY WITH EXTRUDED PANEL SIDE WALLS

CROSS-REFERENCE TO RELATED APPLICATIONS

This application is a divisional of co-pending U.S. application Ser. No. 14/047,510 filed Oct. 7, 2013, now assigned U.S. Pat. No. 9,051,012, which is a continuation of U.S. application Ser. No. 13/049,382 filed Mar. 16, 2011, now U.S. Pat. No. 8,550,542, which claims priority from and benefit of the filing date of U.S. provisional application Ser. No. 61/314,956 filed Mar. 17, 2010, and the entire disclosure of each of said prior applications is hereby incorporated by reference into the present specification.

BACKGROUND

Half-round trailers are well known and comprise a body that includes an open-top cargo space adapted to contain bulk commodities such as sand, salt, construction materials, raw materials, debris, asphalt paving materials, etc. The cargo space of these known half-round trailers is defined by a series of sheets of aluminum alloy (hereinafter "aluminum") that are formed into a radiused other curved shape and connected together to form the tub-like cargo space. The body is supported on a partial-length or full-length chassis including at least one axle with left and right wheel and tire assemblies that allow the trailer to roll across a road or other support surface when pulled by a truck tractor to which the trailer is operably connected.

These known half-round trailers are sometimes preferred for the ease with which the load slides from the cargo space during dumping operations and the fact that the load shifts to the center of the cargo space and downward during dumping operations. Unfortunately, known sheet-style half-round trailers have been found to be unstable during dumping and cornering due to the flexibility of the body and the high ride height associated with known designs. The arrangement of the body relative to the chassis in these known sheet-style half-round trailers also fails to optimize the payload capacity of the cargo space due to the excessive spacing of the body above the chassis and also due to the inherent curvature of the sheets used to construct the body.

SUMMARY

In accordance with one exemplary embodiment, a trailer for carrying bulk commodities includes a chassis, left and right rotating wheel and tire assemblies connected to the chassis, and a body supported on the chassis. The body includes left and right spaced apart side walls respectively located on left and right lateral sides of the body. A bulkhead is located at a forward end of the body and a tailgate is located at a rear end of the body. The body further includes left and right axially extending bottom rails and a floor including a curved upper surface and opposite left and right lateral edges. A lower end of the left side wall and the left lateral edge of the floor are each connected to the left bottom rail. A lower end of the right side wall and the right lateral edge of the floor are each connected to the right bottom rail. The curved upper surface of the floor, the left and right side walls, the bulkhead, and the tailgate define a cargo space adapted for receiving and retaining a bulk commodity cargo.

In accordance with another exemplary embodiment, a trailer body for carrying bulk commodities includes left and right spaced-apart side walls respectively located on left and right lateral sides of the body. The left and right side walls are arranged vertically. A floor includes a curved upper surface that extends from a left edge located adjacent the left side wall to a right edge located adjacent the right side wall. The left and right side walls each include a plurality of extruded panels each including an inner wall and an outer wall spaced from the inner wall.

In accordance with another exemplary embodiment, a trailer includes a chassis and a trailer body connected to the chassis. The trailer body includes left and right vertical side walls and a curved floor. The left and right side walls each include a plurality of extruded panels each including an inner wall and an outer wall spaced from the inner wall.

BRIEF DESCRIPTION OF THE DRAWINGS

FIG. 3 is a simplified section view (with the welds omitted) as taken at line 3-3 of FIG. 1B, showing first and second wall panels abutted to define the right side wall structure (the left side wall structure is identical but with the panels oriented in the opposite direction);

FIG. 3A is an end view of one of the panels of the wall structure of FIG. 3;

FIG. 3E provides an isometric view of a length of the panel extrusion of FIG. 3A;

FIGS. 4A and 4B are respective enlarged views of the left and right bottom rails as taken from detail regions 4A and 4B of FIG. 2, respectively;

FIG. 4C provides an isometric view of a length of the left and right bottom rail extrusion;

FIG. 5 is a top plan view that illustrates an exemplary floor for a half-round trailer formed in accordance with the present development;

FIG. 5A shows section A-A of FIG. 5;

FIGS. 6A and 6B are respective enlarged views of the left and right chassis beams as taken from detail regions 6A and 6B of FIG. 2.

FIG. 7A shows the structure of the left and right draft arm guide systems, with the draft arm guide system in its disengaged position, which occurs when the trailer body is located in and moving to or from its load dumping position;

FIG. 7B is similar to FIG. 7A but shows the draft arm guide system in its engaged position, which occurs when the trailer body is in its load carrying position;

DETAILED DESCRIPTION

Figure 1A:
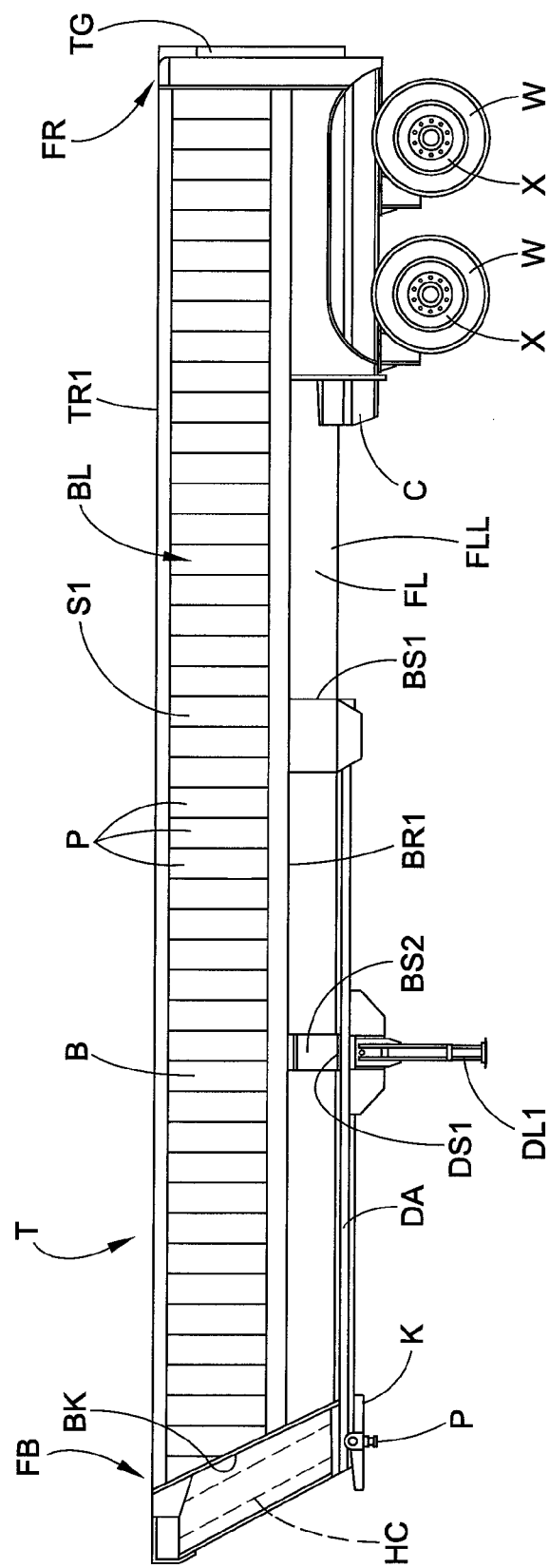
FIG. 1A is a right side view of a trailer T formed in accordance with the present development.
Figure 1B:
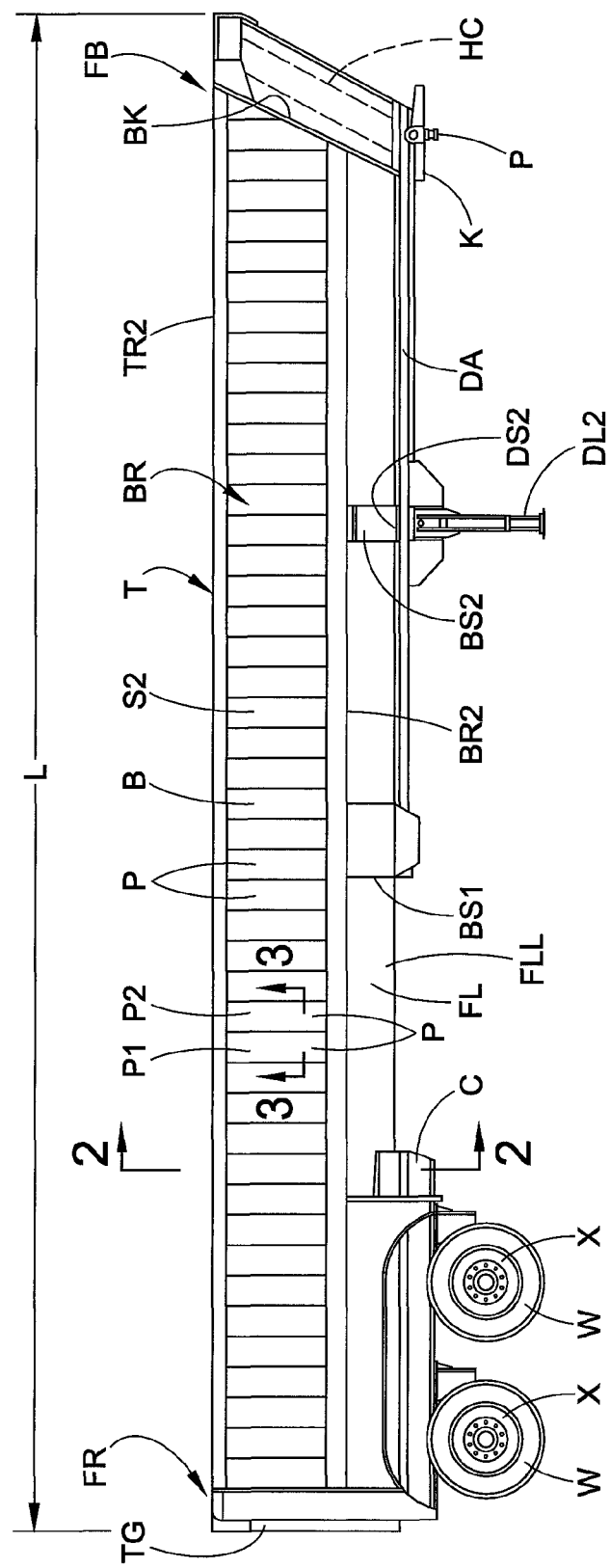
FIG. 1B is a left side view of a trailer T formed in accordance with the present development.
Figure 2:
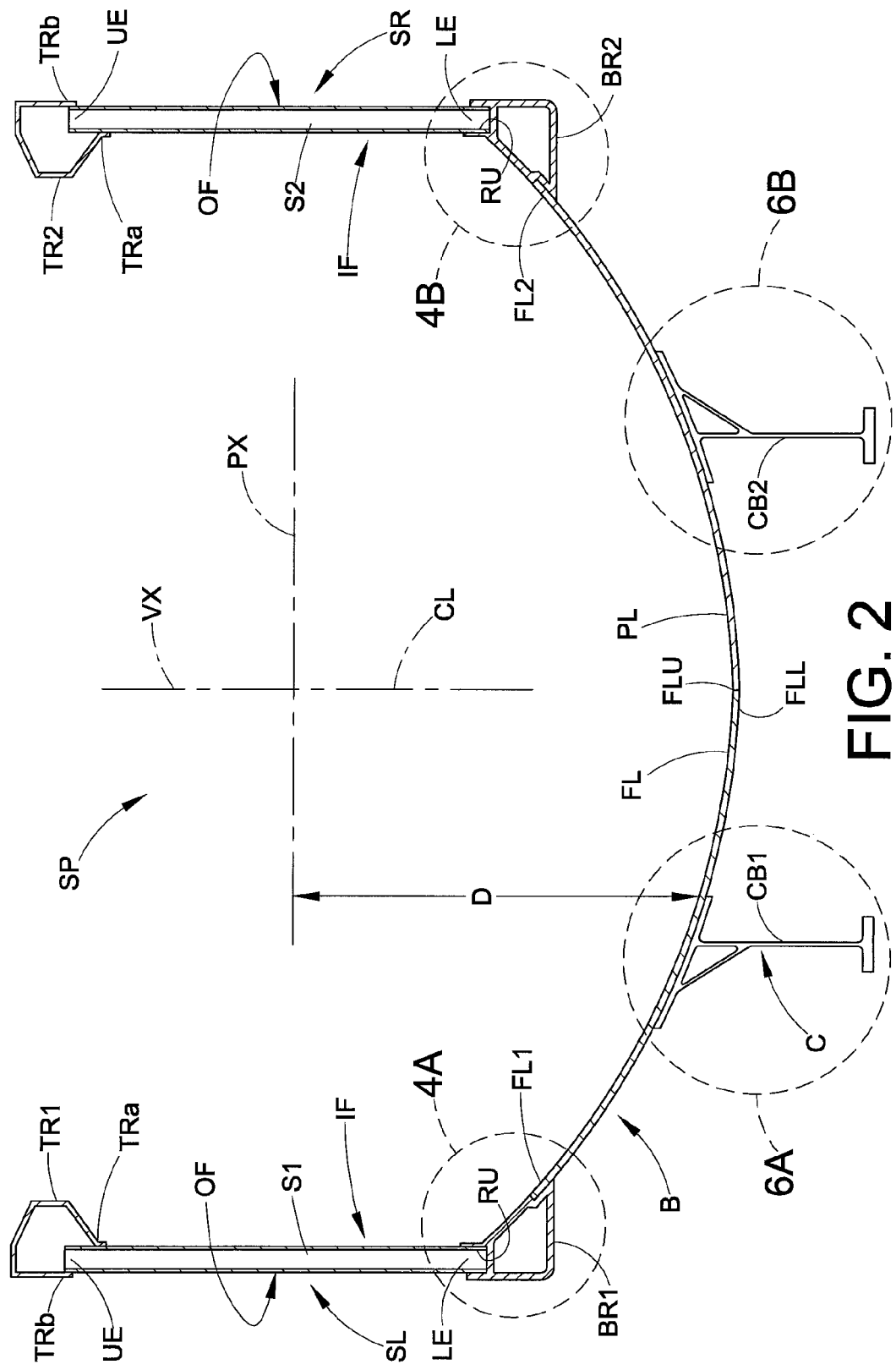
FIG. 2 is a section view of the trailer as taken at line 2-2 of FIG. 1B (with features in the background not shown to simplify the drawing)

FIG. 1A is a right side view of a trailer T formed in accordance with the present development. FIG. 1B is a left side view of the trailer of FIG. 1A. FIG. 2 is a section view taken at line 2-2 of FIG. 1B (with features in the background not shown to simplify the drawing). Referring to these drawings, the trailer T comprises a body B that defines an open top cargo space SP (FIG. 2) adapted for hauling bulk commodities. The body B comprises left and right parallel spaced-apart side walls S1,S2 that lie in respective vertical planes adjacent respective left and right lateral sides SL,SR of the body. The body B further comprises a bulkhead or bulkhead wall BK that is located and extends between and interconnects the left and right side walls S1,S2 and that is located at and closes a forward end of the cargo space SP at a forward end FB of the body. The bulkhead BK comprises a wall structure that is constructed similarly to the left and right side walls S1,S2 and/or comprises a conventional wall structure of any desired construction. The body B also includes a tailgate TG located at a rear end of the body FR and that is located and extends between the side walls S1,S2 and that is located at and selectively closes a rear end of the cargo space SP. The tailgate TG is pivotally connected to the left side wall S1 and/or right side wall S2 and pivots about a vertical and/or horizontal axis between a closed position where it blocks the rear opening of the cargo space SP between the side walls S1,S2 and an opened position for dumping the load contained in the cargo space SP through the rear opening of the cargo space SP. The tailgate TG comprises a wall structure that is constructed similarly to the left and right side walls S1,S2 and/or comprises a conventional wall structure of any desired construction. A floor FL extends laterally between the bottom of the left side wall S1 and the bottom of the right side wall S2, and the floor also extends axially between the bottom of the bulkhead BK and the bottom of the tailgate TG. The tailgate TG typically lies in a vertical plane. The bulkhead BK can lie in a vertical plane or, as shown, can be angled from vertical as desired. A hydraulic lift cylinder HC (FIG. 1A) is provided adjacent bulkhead for elevating the forward end FB of the trailer body B relative to the tailgate TG for dumping a payload from the cargo space SP through the open tailgate TG. The body B defines an axial length L between the bulkhead BK and the tailgate TG, which can be measured at the floor or can be measured at the open top of the trailer, parallel to the longitudinal axis of the body.

The body B and, more particularly, the floor FL thereof is supported on a chassis C. As shown, the chassis C is a partial-length, "frameless" type that extends under only a part of the axial length L of the body B. Left and right draft arms DA are respectively pivotally connected adjacent the opposite left and right lateral sides SL,SR of the body B, generally near the mid-point of the axial length L, and extend forward to a location adjacent the bulkhead BK where they are each connected to a kingpin plate K including a kingpin P adapted to be connected to a fifth wheel of an associated truck tractor. In the exemplary embodiment, the respective inner ends of the left and right draft arms are pivotally connected to opposite left and right sides of a main bolster BS1 bolster that is connected to and located beneath the floor FL and that extends laterally across the trailer body from the left side SL to the right side SR and that supported the floor in a cradle-like fashion. Alternatively, the chassis C can extend under a longer section of the body B so as to be a "quarter frame" or a "full frame" type. In the case of a full frame embodiment, the chassis C extends under and supports the full axial length of the body B, in which case the draft arms DA are not provided, and the kingpin plate K is connected directly to the chassis C.

At least one axle X is connected to the chassis C. Each axle X includes left and right spaced-apart wheel and tire assemblies W located respectively on the opposite left and right lateral sides of the chassis C for supporting the body B for rolling movement on a road or other support surface. In the illustrated embodiment, the body B and chassis C do not pivot relative to each other when the body B is positioned in its load dumping position to dump its cargo through the open tailgate TG. Instead, the body B and chassis are tipped upward about the only or the rear-most pair of left/right wheel and tire assemblies W using the draft arms DA and lift cylinder HC as is known in the art when front FB of the body is elevated relative to the rear FR of the body during load dumping operations. In an alternative embodiment, the body B is hinged to the chassis C adjacent the tailgate TG and pivots relative to the chassis C about a horizontal axis as controlled by the lift cylinder HC during cargo dumping operations when front FB of the body is elevated relative to the rear FR of the body during load dumping operations.

The left and right side walls S1, S2 are each constructed from a plurality of extruded aluminum double-walled panels P, each of which panels P is oriented vertically in the exemplary embodiment. FIG. 3 is a simplified section view taken at line 3-3 of FIG. 1B, showing first and second wall panels P1,P2 from the plurality of wall panels P that are abutted to define the wall structure S2 (the wall structure Si has the same structure). Welds are not shown in FIG. 3 in order to reveal the profile and structure of the panels P (P1,P2). The first and second abutted panels P1,P2 are fixedly secured together by welding, preferably along the entire length where the panels P1,P2 are abutted with each other as described in more detail below. Alternatively, the first and second panels P1,P2 are connected together by one or more mating interlocking mechanical structures or are merely abutted without being welded or otherwise connected together.

FIG. 3A is an end view of an individual panel P that shows the extrusion profile thereof. FIG. 3E provides an isometric view of a length of the panel of FIG. 3A. Each panel P is preferably defined as a monolithic double-walled extrusion of aluminum alloy, such as 6061-T6 aluminum alloy or another suitable aluminum alloy (also referred to herein simply as aluminum). As noted, it is preferred that the adjacent abutted panels P of walls S1,S2 be secured to each other by welding, although use of an adhesive is contemplated and deemed within the scope of the present development. Each panel P comprises a smooth, flat, planar inner wall IW oriented toward inside of cargo-retaining space SP of trailer body B, and a smooth, flat, planar outer wall OW oriented toward outside of trailer body B. The inner and outer walls IW,OW are parallel and spaced apart from each other. Each panel P also includes first and second end walls E1,E2 that extend between and interconnect the inner and outer walls IW,OW. The end walls E1,E2 are preferably also arranged parallel to each other and spaced-apart relative to each other and lie perpendicular to the inner and outer walls IW,OW. The walls IW,OW,E1,E2 define the panel P to have a hollow core PC. One or more support webs PW (two as shown herein) optionally extends between the inner and outer panel walls IW,OW at a located between the end walls E1,E2 (e.g., at the midpoint or spaced evenly from the end walls E1,E2) to strengthen the panel P and prevent inward and outward flexing movement of the inner and outer walls IW,OW relative to each other, in which case the support web PW divides the hollow core into two or more separate hollow core sections PC (three as shown herein). The inner and outer panel walls IW,OW can have the same minimum thickness but, because the inner wall IW is in contact with the bulk commodity cargo while the outer wall OW is not, it is preferred that the inner wall IW have a minimum thickness that is greater than the minimum thickness of outer wall OW to provide added strength and wear resistance to the inner wall while reducing the weight of each panel P. The first end wall E1 includes a rib R that projects outwardly away from the panel P. The second end wall E2 includes a groove G that opens outwardly away from the panel P. When first and second panels P1,P2 are abutted to define the wall structure S2, the rib R of one panel P is fitted into the groove G of the adjacent abutted panel P, and the panels are preferably fixedly secured by a continuous weld that extends completely or at least substantially over the entire length where the panels P are abutted, and it is preferred that the abutted panels P be so welded at two locations: (i) at an inner seam IS (FIG. 3) defined adjacent and between their respective inner walls IW; and, (ii) at an outer seam OS (FIG. 3) defined adjacent and between their respective outer walls OW. The successive inner walls IW of the abutted panels P (P1,P2) define a smooth inner face IF of each side wall S1,S2, and the successive outer walls OW of the abutted panels P (P1,P2) define a smooth outer face OF of each side wall S1,S2.

Figures 3B, 3C:
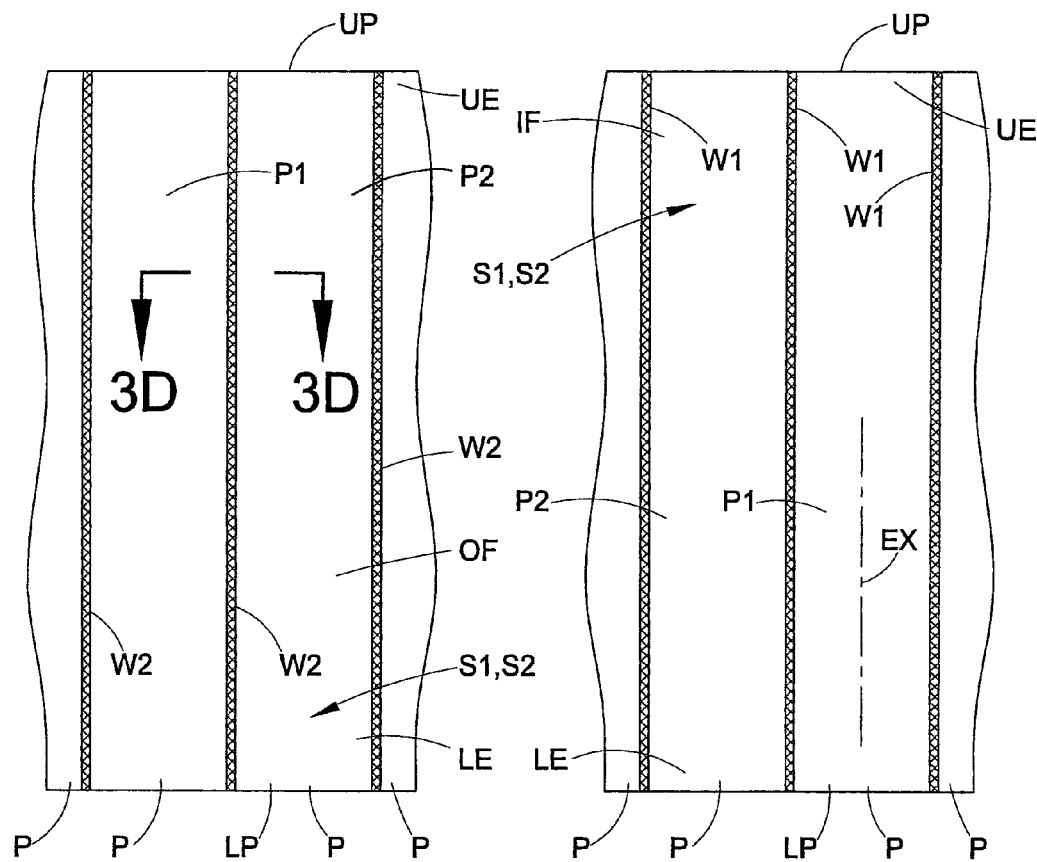
FIG. 3B is a partial elevational view of the outer face of a wall structure formed in accordance with the present development.
FIG. 3C is a partial elevational view of the inner face of a wall structure formed in accordance with the present development.
Figure 3D:
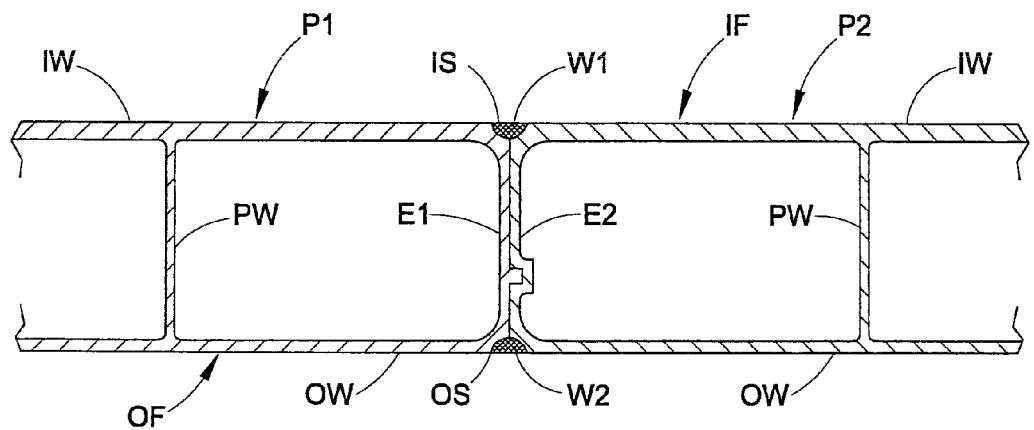
FIG. 3D is a section view as taken at line 3D-3D of FIG. 3B to illustrated the inner and outer welds.

FIG. 3B is an elevational view of the outer face OF of a side wall S1,S2 defined by the abutted panels P according to the exemplary embodiment. FIG. 3C is an elevational view of the inner face IF of a side wall S1,S2 defined by a plurality of abutted panels P according to the exemplary embodiment. It can be seen that each panel P1,P2 includes an upper end UP and a lower end LP that is spaced vertically below the upper end UP when the panel P is installed as part of the body B. Each panel P is extruded along an extrusion axis EX that extends axially between the upper and lower ends UP,LP such that the hollow core(s) PC run continuously from the upper end UP to the lower end LP. The extrusion axis EX is oriented vertically when the panels P are installed in the sidewalls S1,S2 of the body B. A first or inner weld W1 extends continuously and uninterrupted in and along the inner seam IS that is defined adjacent and between the respective inner walls IW of each pair of abutted panels P (e.g., the abutted panels P1,P2), along the full axial height of the panels P from the upper end UP to the lower end LP. A second or outer weld W2 extends continuously and uninterrupted in and along the outer seam OS that is defined adjacent and between the respective outer walls OW of each pair of abutted panels P (e.g., the abutted panels P1,P2), along the full axial height of the panels P from the upper end UP to the lower end LP. The inner and outer welds W1,W2 are defined to be as flat as possible such that they fill the respective inner and outer seams IS,OS and are flush with the inner and outer wall faces IF,OF without projecting outwardly from the inner and outer wall faces IF,OF. As such, it can be seen that the left side wall S1 and said right side wall S2 each comprise a respective plurality of the extruded aluminum panels P that are abutted in series, wherein each of the panels P comprises spaced apart inner and outer walls IW,OW, and wherein the inner walls IW of the panels P of the left side wall S1 define an inner face IF of the left side wall S1, and the inner walls IW of the panels P of the right side wall S2 define an inner face IF of said right side wall S2. The inner and outer seams IS,OS and the inner and outer welds IW,OW can be referred to as "left" and "right inner and outer seams/welds IS,OS/IW,OW for the left and right side walls S1,S2, respectively.

The side walls S1,S2 include respective upper edges UE defined by the panel upper ends UP and include respective lower edges LE defined by the panel lower ends LP. Referring again specifically to FIG. 2, the left and right top rails TR1,TR2 are respectively secured to the upper edges UE of the left and right side walls S1,S2. Top rails TR1,TR2 are also defined as monolithic aluminum extrusions that extend continuously the full axial length of the side walls S1,S2. The top rails TR1,TR2 are oriented so as to be mirror images of each other and have the extrusion profile as shown in FIG. 2, where the wall upper edge UE is received into an open space defined between spaced-apart inner and outer ends TRa, TRb of the extrusion. The inner and outer ends TRa,TRb are respectively welded to the inner and outer faces IF,OF of the corresponding wall structure S1,S2, preferably each by a continuous weld that extends for the full axial length of the top rail TR1,TR2

Likewise, left and right bottom rails BR1,BR2 are respectively secured to the lower edges LE of the left and right sidewalls S1,S2. Bottom rails BR1,BR2 are also defined as monolithic aluminum extrusions that extend continuously for the full axial length of the side walls S1,S2. The left and right bottom rails BR1,BR2 are respectively shown in more detail in FIGS. 4A and 4B, where the extrusion profile of the rails BR1,BR2 can be seen. FIG. 4C provides an isometric view of a length of the left and right bottom rail extrusion. The left and right bottom rails BR1,BR2 are arranged to be mirror images of each other, and each include an upwardly opening recess RU into which the lower edge LE of the respective side wall S1,S2 is received. The recess RU is preferably upwardly opening and U-shaped as shown, defined between first and second spaced-apart, vertical inner and outer flanges RF1,RF2. The side walls S1,S2 are welded to their respective bottom rails BR1,BR2, preferably by welds that extend continuously the full axial length of the side walls S1,S2 at locations W1,W2 where the inner and outer flanges RF1,RF2 respectively abut the inner and outer faces IF,OF of the side walls S1,S2. The main bolster BS1 preferably extends between and interconnects the left and right bottom rails BR1,BR2 to further increase the strength and rigidity of the body B.

The bottom rails BR1,BR2 each define a hollow core BC that can serve as a conduit for wiring and/or hydraulic lines, a location to mount lighting, etc. The bottom rails BR1,BR2 each include a transition wall TW that is curved or angled relative to the inner flange RF1 so that the transition wall TW is inclined downwardly as it extends inwardly away from inner face IF of the respective wall S1,S2. This transition wall TW includes a floor recess FR located adjacent its innermost edge. The floor recess FR of the left bottom rail BR1 is adapted to receive the left lateral edge FL1 of the floor FL, and the floor recess FR of the right bottom rail BR2 is adapted to receive the right lateral edge FL2 of the floor FL. In this manner, the left bottom rail BR1 is located between and interconnects the left side wall S1 to the left lateral edge FL1 of the floor FL, and the right bottom rail BR2 is located between and interconnects the right side wall S2 to the right lateral edge FL2 of the floor FL. The floor recess FR is dimensioned relative to the thickness of the floor FL at the left and right edges FL1,FL2 such that an upper (or inner) surface FLU of the floor FL lies flush with the outer surface TWS of the transition wall TW, and the transition wall TW thus becomes an extension of the floor upper surface FLU. The left and right edges FL1,FL2 of the floor FL are received in the floor recesses FR of the bottom rails BR1,BR2 for the full axial length of the floor FL and are preferably welded to the respective left and right bottom rails BR1,BR2 by a weld located at location FLW where the floor edge FL1,FL2 lies adjacent the step or shoulder located between the outer surface TWS of the transition wall TW and the floor recess FR, with the weld extending continuously for the full axial length of contact between the floor edge FL1,FL2 and the respective bottom rail BR1,BR2. As such, the left and right floor edges FL1,FL2 are located respectively adjacent and are connected to the left and right bottom rails BR1,BR2, and the left and right bottom rails BR1,BR2 are located respectively adjacent and are connected to the lower edges LE of the left and right side walls S1,S2.

A protective replaceable polymeric liner PL (FIG. 4A) preferably covers the entire upper surface FLU of the floor FL and extends between and at least partially covers the outer surfaces TWS of the transition walls TW of the left and right bottom rails BR1,BR2. As shown, one or more a liner plates LP are welded or otherwise connected to each bottom rail BR1,BR2 along the axial length of each bottom rail such that a liner slot LS is defined between the liner plate LP and the transition wall outer surface TWS along the entire axial length of the floor (only the liner plate LP associated with the left bottom rail BR1 is shown, but the liner plate LP for the right bottom rail BR2 has a corresponding structure and installation). The liner slot LS can be continuously defined by a single liner plate LP, or the liner slot LS can comprise multiple spaced-apart slot regions defined respectively individual separate liner plates LP connected to the bottom rail BR1,BR2. The liner PL is slidably received in these slots LS for installation and replacement. The liner is bolted to the body or otherwise captured in the liner slots LS so that it does not escape from the liner slots LS during use.

Referring to FIGS. 5 and 5A, the floor FL is preferably defined from two or more interconnected aluminum sheets FS1,FS2. One suitable thickness for the sheets FS1,FS2 is ¼ inch, but other thicknesses can be used. Each sheet FS1,FS2 of aluminum flooring sheet is rolled so as to define a concave upper (or inner) surface FLU and a convex lower (or outer) surface FLL. The curvature can be defined by a circular radius or other curved shape. Each individual sheet of flooring material FS1,FS2 extends in a single one-piece (non-fabricated) width WS from the left lateral edge FL1 of floor FL to the right lateral edge FL2 of floor FL. The two sheets FS1,FS2 of flooring material are welded together in axial succession at location FW by a weld that extends continuously between the left and right lateral edges FL1, FL2 of the floor FL to provide a floor FL that extends the full axial length of the trailer body B. Depending upon the axial length of the trailer body B and the available size of the sheets FS1,FS2, more or less than the illustrated two sheets FS1,FS2 can be used to define the floor FL, e.g., one sheet, three sheets, or more, but in each case each sheet FS1,FS2 has a width WS that is sufficient to extend from edge FL1 to edge FL2 in one-piece. The weld or other connection between the sheets FS1,FS2 at the location FW is preferably concealed under the main bolster BS1.

FIG. 2 shows that the chassis C is connected to the convex lower/outer surface FLL of the floor FL. In particular, the chassis C comprises left and right parallel spaced apart beams CB1,CB2 that are each defined from a single monolithic aluminum extrusion or that are each fabricated from two or more aluminum extrusions. FIGS. 6A and 6B are enlarged detail views that respectively show the left and right chassis beams CB1,CB2 and their connection to the floor FL. As shown, each chassis beam CB1,CB2 comprises a lower portion CR defined from an inverted T-shaped extrusion and an upper portion CU defined from an extrusion including a saddle portion SD. The upper and lower portions CU,CR are welded together, e.g., at a location CW where their respective webs CWU,CWL are abutted, to define the chassis beams CB1, CB2. The chassis beams CB1,CB2 are arranged in the chassis C so as to be mirror images of each other. The lower flange LF of each chassis beam CB1,CB2 provides a structure to which the axles X and wheel/tire assemblies W are connected through hangers and associated components that are bolted or otherwise connected to the lower flange LF.

The left and right saddle portions SD of the left and right chassis beams CB1,CB2 comprise or define respective left and right upper concavely radiused or otherwise curved surfaces SDS that match the radius or other curve of the outer/lower surface FLL of the floor abutted therewith, so that the lower floor surface FLL conforms to and is supported on the left and right saddle portions SD. Where the floor FL overlaps the saddle portion SD, the floor FL has added strength due to the stacked thickness of the floor FL and the saddle portion SD. The left and right chassis beams CB1,CB2 are arranged as mirror images of each other, with their respective left and right saddle surfaces SDS oriented inward toward the center of the cargo space SP, with the outer edges SE of the saddle portion SD located vertically above the inner edges SI of the saddle portion SD. The chassis beams CB1,CB2 are each connected to the outer/lower surface FLL of the floor FL by welding, preferably by continuous axially extending welds at locations SW1,SW2 over the entire length of contact between the floor FL and the saddle portion SD.

It can be seen in FIG. 2 that the concavely curved upper floor surface FLU is spaced a variable distance D from an imaginary horizontal reference plane PX that extends through the cargo space SP, i.e., the reference plane PX is perpendicular to the left and right side walls S1,S2 and/or is perpendicular to a vertical reference plane VX that extends parallel to the left and right side walls S1,S2. The distance D is maximized when measured at the longitudinal or axial centerline CL of the body B, and decreases symmetrically and progressively as the distance D is measured closer to the left and right side walls S1,S2. Alternatively stated, the inner or upper surface FLU of the floor FL follows a curved (e.g., circular arc radius) path as it extends from its left edge FL1 that is located adjacent the left side wall 51 and connected to the left bottom rail BR1 to its right edge FL2 that is located adjacent the right side wall S2 and connected to the right bottom rail BR2.

As shown in FIGS. 1A and 1B, the trailer T includes a forward bolster BS2 located between the main bolster BS1 and the bulkhead BK. Like the main bolster BS1, the forward bolster BS2 comprises an aluminum saddle or cradle member that extends from the left bottom rail BR1 to the right bottom rail BR2 and that is connected to both the left and right bottom rails BR1,BR2 and that also is connected to the lower surface FLL of the floor FL and that supports the floor. The trailer T further comprises a left draft arm guide system DS1 located and acting between the left draft arm DA and the left side of the forward bolster BS2 and a right draft arm guide system DS2 located and acting between the right draft arm DA and the right side of the forward bolster BS2. FIGS. 7A and 7B show the structure and operation of the left and right draft arm guide systems DS1,DS2. In each case, the draft arm guide system DS1,DS2 comprises a male portion MP connected to the corresponding draft arm DA and a female portion FP connected to the forward bolster BS2 or other part of the trailer body B. The male and female portions MP,FP mate when the trailer body B is located in its load-carrying position (FIGS. 1A, 1B, 7B) and separate when the trailer body is moved to its dump position (FIG. 7A). The male portion MP comprises a conical or frusto-conical outer surface MPS that converges as the male portion moves outward from its mounting location, i.e., moving away from the draft arm DA in the illustrated embodiment. The female portion FP comprises a conical recess or opening that comprises a conical surface FPS that corresponds to the conical surface MPS of the male portion MP such that male portion MP is closely received in the female portion FP and the surfaces MPS,FPS engage each other with the male and female portions mate. The tapered shape of the male portion MP and the corresponding tapered shape of the female portion FP ensure that the male portion MP is guided into the female portion FP as they move toward each other and into engagement. As such, sliding engagement of the conical male surface MPS with the conical female surface FPS guides the male portion to the center of the female portion, which serves to align the trailer body B over the draft arms DA as the trailer body moves to its load carrying position from its load dumping position. The tight mating engagement of the tapered surfaces MPS,FPS also prevents left/right lateral movement of the trailer body B over the draft arms DA when the trailer is being pulled. The trailer T further comprises a dolly system comprising left and right selectively extensible legs DL1, DL2 (FIGS. 1A & 1B) for supporting the forward end of the trailer T when the kingpin P is not connected to an associated truck tractor. The left and right dolly legs DL1,DL2 are respectively connected to the left and right draft arms DA, and are located to be aligned with and located directly beneath the respective left and right draft arm guide systems DS1,DS2. In this manner, the weight of the trailer body B transferred to the draft arms DA through the draft arm guide systems DS1,DS2 is substantially carried by the dolly legs DL1,DL2 which limits bending forces on the draft arms DA. The positions of the male and female portions MP,FP can be interchanged such that the male portion MP is connected to the trailer body B and the female portion is connected to the draft arm DA.

Figure 8:
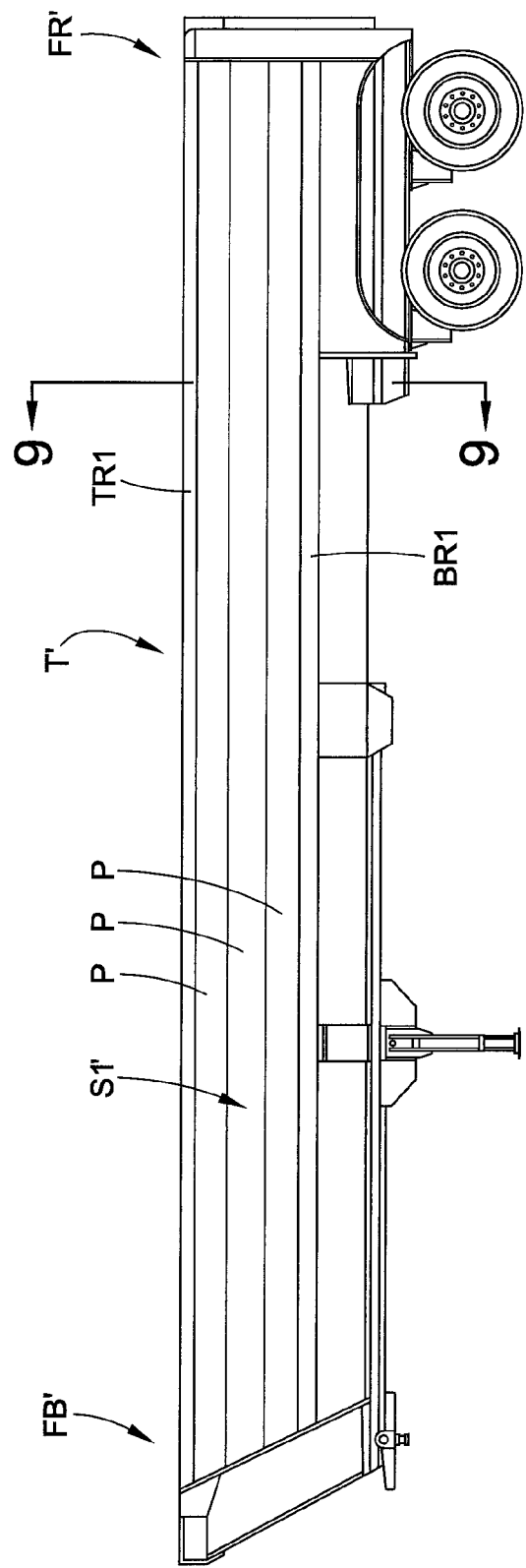
FIG. 8 shows an alternative trailer design with the extruded double-walled panels arranged horizontally instead of vertically.
Figure 9:
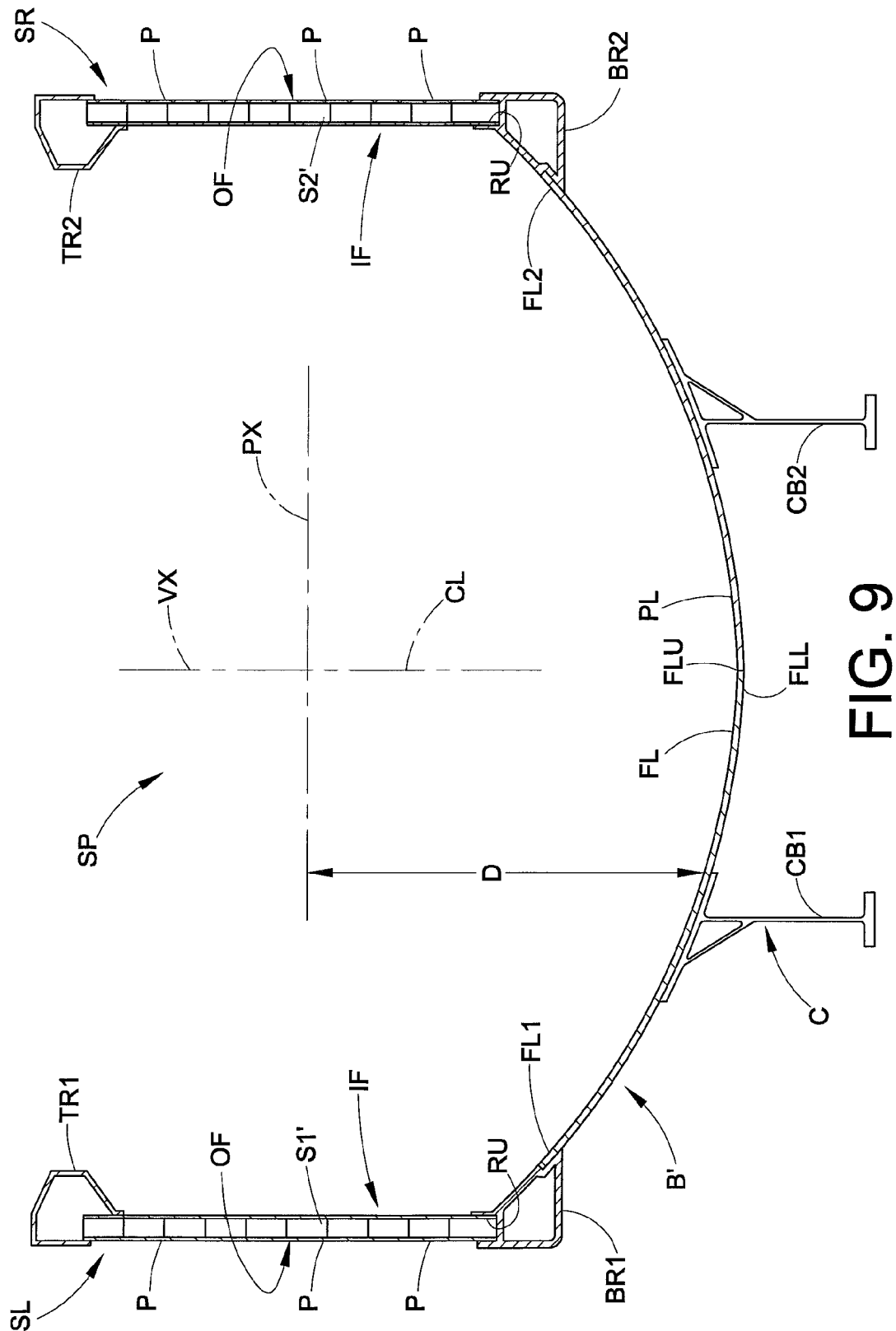
FIG. 9 is a section view of the trailer as taken at line 9-9 of FIG. 8 (with features in the background not shown to simplify the drawing).

FIG. 8 illustrates an alternative trailer T' and trailer body B' that are identical to the trailer T and body B except as shown and/or described. Identical components relative to the trailer and body B are identified with identical reference characters, while modified versions of like components are identified with like reference characters including a primed (') designation. FIG. 9 is a section view of the trailer as taken at line 9-9 of FIG. 8, with features in the background not shown to simplify the drawing. The trailer T' comprises alternative left and right side walls S1',S2' that are identical to the side walls S1,S2 except that the wall panels P, which are themselves identical in structure to the panels P described above in relation to the trailer T, are arranged horizontally parallel to the bottom and top rails BR1,BR2, TR1,TR2. It can be seen that each panel P extends continuously without interruption between the forward end FB' of the body B' and the rear end FR' of the body B'. As shown, the extrusion axis EX of each panel P of the left side wall S1' extends continuously parallel left bottom rail BR1 and the left top rail TR1, and the extrusion axis EX of each panel P of the right side wall S2' extends continuously parallel right bottom rail BR2 and the right top rail TR2.

A method of constructing a trailer T or T' includes defining the floor FL from one or more sheets of aluminum that are formed into the desired radius or other continuously curved shape as described above. The floor is connected to the left and right bottom rails BR1,BR2 as described above, with the left floor edge FL1 welded to the left bottom rail BR1 and the right floor edge FL2 welded to the right bottom rail BR2. The chassis C is secured to the lower/outer surface FLU of the floor FL by connecting the respective left and right curved saddle surfaces SDS of the left and right saddle portions SD to the lower/outer surface FLL of the floor by welding. The left and right side walls S1 ,S2 (or S1',S2'), which are preferably separately pre-constructed from the abutted panels P are then respectively connected and fixedly secured to the left and right bottom rails BR1,BR2 as described above. The left and right top rails TR1,TR2 are then installed on the left and right side walls S1,S2, unless they were previously installed as part of the side wall pre-construction process. The bulkhead wall BK and tailgate TG are then installed to close the opposite forward and rear ends FB,FR or the trailer body B,B'. In one embodiment, the bulkhead BK and tailgate TG each comprise a wall that extends between and interconnects the side walls S1,S2, with the tailgate being pivotally or otherwise movably connected to at least one of the side walls S1,S2 or another portion of the trailer body B,B' so that the tailgate TG is selectively pivoted to an opened position for opening the rear FR of the body as needed to dump cargo from the cargo space SP.

The disclosure has been described with reference to the exemplary embodiments. Modifications and alterations will occur to others upon reading and understanding the preceding detailed description, and it is intended that the disclosure be construed as including all such modifications and alterations in so far as they come within the scope of the appended claims or the equivalents thereof.

The invention claimed is:

1. A trailer body for carrying bulk commodities, said trailer body comprising:
    left and right spaced-apart side walls respectively located on left and right lateral sides of the body, said left and right side walls arranged vertically;
    a floor comprising a curved upper surface that extends from a left edge located adjacent the left side wall to a right edge located adjacent the right side wall;
    said left and right side walls each comprising a plurality of extruded panels each comprising an inner wall and an outer wall spaced from the inner wall.

2. The trailer body as set forth in claim 1, further comprising:
    a left axially extending bottom rail located between said left side wall and said left edge of said floor;
    a right axially extending bottom rail located between said right side wall and said right edge of said floor.

3. The trailer body as set forth in claim 1, further comprising:
    a left axially extending bottom rail;
    a right axially extending bottom rail;
    wherein a lower edge of said left side wall and said left edge of said floor are each connected to said left bottom rail; and,
    wherein a lower edge of said right side wall and said right edge of said floor are each connected to said right bottom rail.

4. The trailer body as set forth in claim 1, wherein said left side wall and said right side wall each comprise a respective plurality of extruded aluminum panels that are abutted in series, wherein each of said panels comprises spaced apart inner and outer walls, and wherein the inner walls of the panels of the left side wall define an inner face of said left side wall and the inner walls of the panels of the right side wall define an inner face of said right side wall.

5. The trailer body as set forth in claim 4, wherein adjacent abutted panels of said left side wall are welded together and adjacent abutted panels of said right side wall are welded together.

6. The trailer body as set forth in claim 5, wherein:
the adjacent abutted panels of said left side wall are welded together by a left inner weld located in a left inner seam defined adjacent the inner walls of the abutted panels and by a left outer weld located in a left outer seam defined adjacent the outer walls of the abutted panels; and,
adjacent abutted panels of said right side wall are welded together by a right inner weld located in a right inner seam defined adjacent the inner walls of the abutted panels and by a right outer weld located in a right outer seam defined adjacent the outer walls of the abutted panels.

7. The trailer body as set forth in claim 6, wherein the left inner and outer welds and the right inner and outer welds extend continuously and substantially coextensive with the left inner and outer seams and the right inner and outer seams, respectively.

8. The trailer body as set forth in claim 1, wherein the curved upper surface of said floor is located a variable distance D from an imaginary reference plane that is oriented perpendicular to the left and right side walls, wherein said distance D is greater when measured at a centerline of the trailer body midway between the left and right side walls as compared to when said distance D is measured at a location between said centerline and either one of said left and right side walls.

9. The trailer body as set forth in claim 3, wherein the curved upper surface of said floor is located a variable distance D from an imaginary reference plane that is oriented perpendicular to the left and right side walls, wherein said distance D is greater when measured at a centerline of the trailer body midway between the left and right side walls as compared to when said distance D is measured at a location between said centerline and either one of said left and right side walls.

10. The trailer body as set forth in claim 9, wherein said left side wall and said right side wall each comprise a respective plurality of extruded aluminum panels, wherein each panel includes an upper end, a lower end, and at least one hollow core that extends along an extrusion axis from said upper end to said lower end, said panels of said left and right side walls arranged vertically such that said lower end of each panel of said left side wall is connected to said left bottom rail and said lower end of each panel of said right side wall is connected to said right bottom rail.

11. The trailer body as set forth in claim 2, wherein said left side wall and said right side wall each comprise a respective plurality of extruded aluminum panels, wherein each panel comprises a hollow core that extends along an extrusion axis, said panels of said left and right side walls arranged horizontally such that said extrusion axis of each panel extends parallel to said left and right bottom rails.

12. The trailer body as set forth in claim 2, wherein said left side wall and said right side wall each comprise a respective plurality of extruded aluminum panels, wherein each panel includes an upper end, a lower end, and a hollow core that extends along an extrusion axis from said upper end to said lower end, said panels of said left and right side walls arranged vertically such that said lower end of each panel of said left side wall is connected to said left bottom rail and said lower end of each panel of said right side wall is connected to said right bottom rail.

* * * * *